Figure 1:
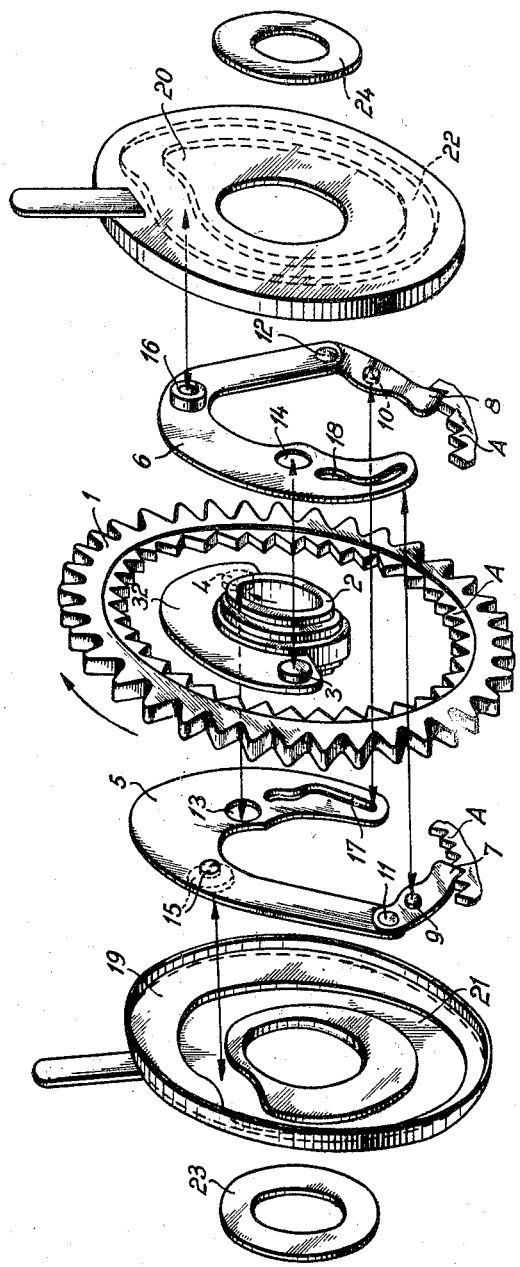

Nov. 11, 1958  W. SPAHR  2,859,631
ACTUATING MECHANISM
Filed July 7, 1953  3 Sheets-Sheet 1

INVENTOR
Werner Spahr
Watson, Cole, Grindle & Watson
attorneys

United States Patent Office 2,859,631
Patented Nov. 11, 1958

2,859,631

ACTUATING MECHANISM

Werner Spahr, Berlin-Wilmersdorf, Germany, assignor to Deutsche Telephonwerke und Kabelindustrie Aktiengesellschaft (De Te We), Berlin, Germany Application July 7, 1953, Serial No. 366,533

7 Claims. (Cl. 74—112)

This invention relates to a rotary actuating mechanism for calculating machines. The structure comprises substantially a control device transmitting a preferably uniform rotary motion into a variable intermittent angular motion, which influences motion transmitting means rotating therewith in such a manner, that at the beginning and at the end of the motion of a member of the actuating mechanism it is caused to perform an angular motion. The members of the motion transmitting means engage or disengage the output member while the drive continues running during the relative stop of the output member and the velocity of the output member uniformly increases from zero to the velocity of operation and uniformly decreases from the velocity of operation to zero.

It is therefore an object of the invention for the control members to influence the motion transmitting means in such a manner that parts of the latter are decelerated to a relative stop position prior to engagement or disengagement respectively and are accelerated after the engagement or disengagement respectively. The starting and/or stopping point and the amount of an angular motion may be determined either by adjusting the control members individually or together or against each other or with each other.

An extension of the duration of the relative stop may be achieved by a plurality of motion transmitters supplementing each other in transmitting the motion. Hitherto known rotary actuating mechanisms have the disadvantage that the driver engages the stopped output member at full speed and moving the latter with a sudden effort. Even the transmission of relatively small torques, e. g. as system units of calculating machines, causes noise and wear and disengagement occurs while the driving member is running. Therefore, the danger of overrunning exists and there is a need for arresting members which create additional noise and are also subjected to wear.

It is almost impossible to transmit greater torques by means of the said mechanism, which imposes a sudden load upon all parts. The latter have to be more strongly designed and necessitate special treatment, that is hardening. Therefore, the dimensions and the cost of manufacture of such a control mechanism are quite large compared with its power.

All the said disadvantages are completely eliminated by the invention and a simple powerful control mechanism having smaller dimensions and lower cost of manufacturer is achieved. The control mechanism may be completely encased, thus increasing its duration of life especially in work shops in which dust is present.

Figure 2:
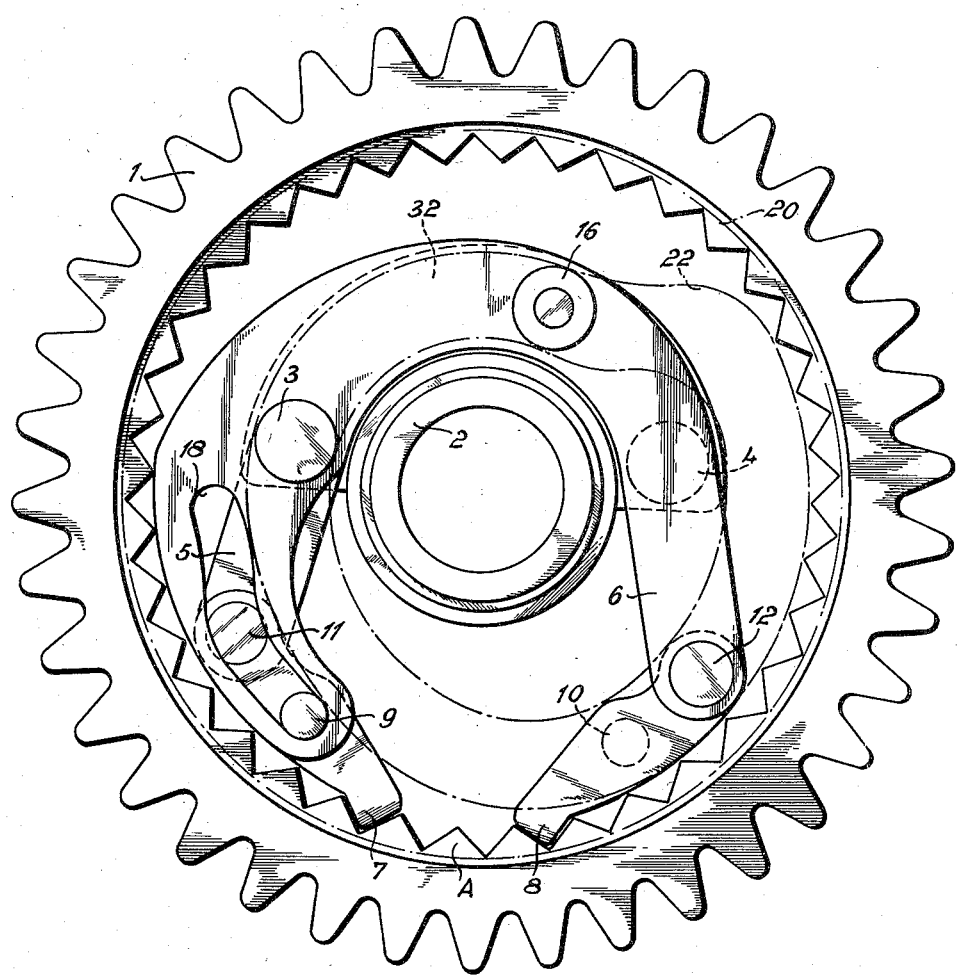
Figure 3:
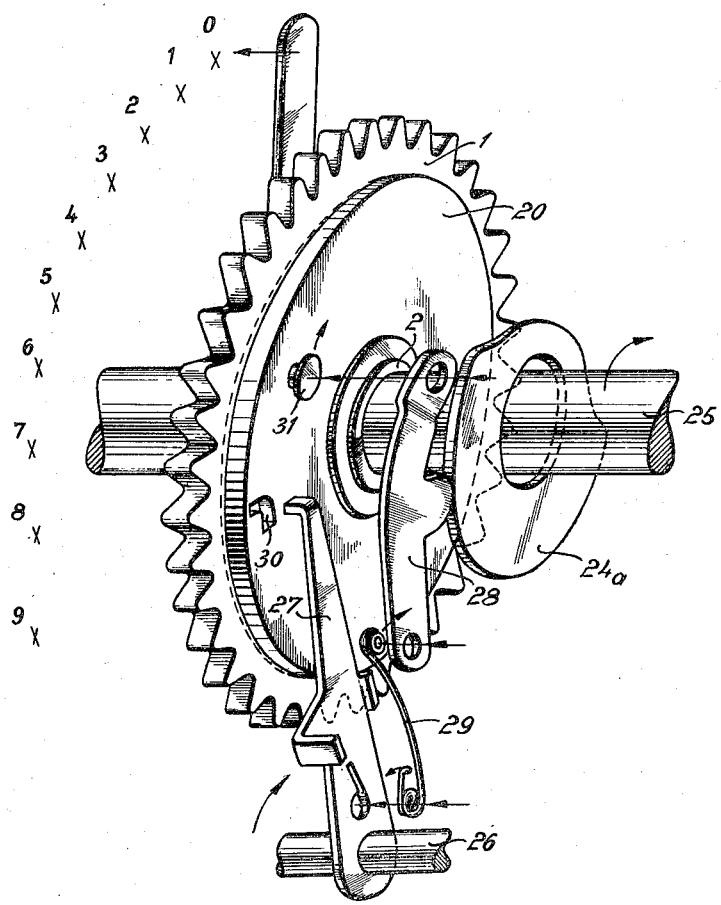

Further objects will be apparent from the following description when considered in connection with the accompanying drawings in which:

Fig. 1 is an exploded view of a device embodying the invention with the parts in perspective, Fig. 2 is a top plan view of the mechanism, and Fig. 3 is a perspective view of an actuating mechanism with a tenth carrying device as a system unit of a calculating machine with certain parts in exploded positions.

The illustrated control mechanism comprises an annular output gear 1 having external and internal teeth and a hub 2 which is securely mounted on a drive shaft (not shown) extending therethrough and provided with a crescent-shaped flange 32 carrying the journal bearings or lugs 3 and 4. Two motion transmitting levers 5 and 6 are each provided with a pawl member respectively 7 and 8, and each pawl 7 or 8 carries a guide pin 9 and 10 respectively and is pivotally connected through bearings 11 or 12 with the lever 5 and 6 respectively. The levers 5 and 6 are pivotally connected to the flange 32, with which they rotate, on the bearings 13 and 14, into which the bearings 3 and 4 extend. Each lever 5 and 6 is further provided with a roller 15 and 16 respectively and the pins 10 and 9 of the pawls 8 and 7 of the levers 6 and 5 engage the guides 17 and 18 respectively.

Adjusting discs 19 and 20 which are mounted with a loose fit on the hub 2 and each carries a cam groove 21 and 22 respectively in which the rollers 15 and 16 are guided. In Fig. 2 the disc 20 is shown as transparent in order to present and illustrate the interior details. The adjusting discs 19 and 20 each have circumferential flanges and are mounted with respect to each other by means of the hub 2 in such a way that the output gear 1 which is provided on both sides with a guide groove, Fig. 1, is held by the flanges of the adjusting discs 19 and 20 so that gear 1 can rotate freely on and between the said discs. End discs 23 and 24 seal against entry of dust so that all moving parts of the adjusting discs 19 and 20 are tightly enclosed. The control mechanism is ready for operation as soon as the parts are assembled in accordance with the horizontal arrows in Fig. 1.

The operation of the control mechanism according to the invention is as follows:

In the position of the driving hub 2 and the cam discs 19 and 20, Fig. 1, the two rollers 15 and 16 engage the inner circular portions of the cam grooves 21 and 22 respectively whereby the gear 1 is driven by the hub 2 as the pawls 7 and 8 engages the internal teeth of the gear. In the working position the pawls 7 and 8 are at a certain distance (see tooth A), Figs. 1 and 2, from each other according to the selected construction and in positive engagement with the gear 1. Both guide pins 9 and 10 are at the ends of the guide cams 18 and 17 respectively of the control levers 6 and 5 respectively, that is remote from the bearings 14 and 13. In this position a positive connection exists between the driving member 2 and the output member 1 and also between the motion transmitting members 5, 6, 7, 8, 9, 10, 11, 12, 17 and 18.

Further clockwise rotation of the hub 2 (see arrow) Fig. 1, brings the roller 16 to that point of the cam groove 22 at which it is guided from the inner to the outer circular portion thereof. During the motion of the roller 16 from the inner to the outer circular portion the angular velocity of pawl 8 is decreasing and will be zero at the center of the cam member. The driven output member 1 is also decreasing its velocity to zero as the pawl 8 is retarded. Simultaneously the pawl 7 with the guide pin 9 has been released from the teeth A due to the rotation of the guide cam 18 about the axis 14. However, as the pawl 8 with the guide pin 10 slides in the guide cam 17 in a direction opposite to the direction of rotation, pawl 8 finally is also released and rotates with the full angular velocity of the still rotating hub 2 as soon as the roller 16 reaches the outer circular portion of curve 22.

In order that the pawls 7 and 8 shall be ready for a new engagement with the teeth A after a full revolution, the lost angular velocity has to be balanced, that is the lever 5 has to be returned from the inner to the outer portion, and the lever 6 from the outer to the inner portion of cam grooves 21 and 22 respectively without bringing the pawls 7 and 8 into engagement. This occurs first in the cam groove 21 with roller 15 and pawl 7 when the guide cam 18 and the guide pin 9 are still turned toward the center. When the guide groove 17 has turned toward the center the roller 16 in groove 22 and the guide pin 10 will follow. Thereafter, the actuating mechanism is ready for a new operation.

The start of a new drive of the output member 1 by means of the levers 5 and 6 with pawls 7 and 8 occurs in a manner similar to that explained above. Terms and actuation of the individual parts will be controlled by the other similar acting members and preferably similar constructional parts (exchange of part 6 with part 5, part 20 with part 19).

Adjustment of the output range of gear 1 may be achieved in accordance with the requirements. The output range is basically dependent on the position of cam groove 21 relative to cam groove 22. The drive range "zero" is achieved when the adjusting discs 19 and 20 are positioned in such a manner that the pawls 7 and 8 engage the gear 1 but are disengaged prior to the beginning of the rotation of gear 1, i. e. during the relative stop.

If it is supposed that the direction of rotation is in the direction indicated by the arrow (drive rotating clockwise), Fig. 1, then substantially eight adjusting possibilities are available as follows:

(b) With discs 19 and 20 continuously rotating with the hub 2, the output ranges may be increased with respect to those mentioned under (a). The value of the output range increases when the rotation of the members 19 and 20 approaches that of the hub 2. This arrangement is only important in certain cases because a special cam form is needed for each velocity in order to maintain the relative stop during engagement and disengagement of the pawls 7 and 8.

(c) With the discs 19 and 20 intermittently rotating with the hub 2, preferably beginning and ending during the engagement of the pawls 7 and 8, the output range may be increased to infinity (the discs intermittently running with the same velocity as the hub); the same cam configuration is used as that with the non-rotating discs 19 and 20 (point a).

An actuating mechanism with the possibilities (a) and (c) therefore has an adjusting range between "zero" and "infinity."

A practical example illustrates the operation of an actuating mechanism according to the invention as follows.

Fig. 3 shows an actuating mechanism as a system unit of a calculating machine with an attached tenth carrying device which operates as follows:

By means of the adjusting disc 19, the numbers 0–9 are adjustable. Therefore the point of engagement of the pawls 7 and 8 is changed. The terminal point determined by the adjusting disc 20 is determined by a lever 27 of the tenth control device which extends into a slot 30 of the disc 20. A number roller with the nu-

| | Adjustment of adjusting member | | Output range (drive of 1) | Engagement of 7 and 8 | Disengagement of 7 and 8 |
|---|---|---|---|---|---|
| | 19 | 20 | | | |
| 1 | Counterclockwise | unchanged | larger | earlier | unchanged. |
| 2 | ____do____ | clockwise | ____do____ | ____do____ | later. |
| 3 | unchanged | ____do____ | ____do____ | unchanged | Do. |
| 4 | clockwise | unchanged | smaller | later | unchanged. |
| 5 | ____do____ | counterclockwise | ____do____ | ____do____ | earlier. |
| 6 | unchanged | ____do____ | ____do____ | unchanged | Do. |
| 7 | Both at same distance clockwise | | unchanged | later | later. |
| 8 | Both at same distance counterclockwise | | ____do____ | earlier | earlier. |

It will be observed that power may be transmitted in both directions of rotation in the same manner and that only one direction (hub 2 rotating clockwise) was selected for the sake of a better understanding of this invention.

More variants may be obtained by combining some of the eight possibilities among each other.

The adjustment of the output range and the timing of the beginning and the end of the drive (engagement and disengagement of the pawls 7 and 8) was based upon the discs 19 and 20 which are not moving except for the adjusting movements. It is mentioned that the adjustments of the discs 19 and 20 may be performed at any time even when the actuating mechanism is in operation. However, the adjusting possibilities are not exhausted. There are so many that only a few can be mentioned; for example, intermittent rotation, swinging back and forth or continuous rotation of the discs 19 and 20 simultaneously or each individually or at one time the first and another time the second. It should be observed that the control cams are formed in such a manner that it is fairly sure that there is a relative stop during the engagement and disengagement of the pawls 7 and 8 with the gear 1.

Summarizing the adjustability of the output range, it is noted:

(a) With the adjusting members 19 and 20 at rest, output ranges from "zero" to 180° may be obtained depending on the configuration of the cam which determines the top value.

merals 0–9 having ten teeth and coupled with the actuating device would therefore be rotated in accordance with the adjusted numeral at each full revolution of the hub 2. If the number roller is rotated over "9" a cam disposed between "9" and "0" contacts the lever 27, through an intermediate member, of the tenth carrying device of the next higher system unit.

The lever 27 of the tenth device is loosely mounted with one end on the stationary axle 26. A second lever 28 is pivotally connected at one end to the adjusting member 20 by means of pin 31 and its other end is connected to a spring 29 one end of which rests in the counter lever 27. The levers 27 and 28 cooperate resiliently in a knee-action like manner (toggle). In the bent position, the lever 27 has its nose in a notch of the guide slot 30 of the member 20 and is holding it in its position under slight spring pressure (spring bearing in lever 27 to axle 26). When the cam of the number roller "9" to "0" of the next lower system causes a tenth actuating impulse by contacting the lever 27, the nose of the lever 27 is released from the notch of the slot 30, whereby, initiated by the cam portion of slot 30, the spring 29 moves both levers 27 and 28 in the straight position, thereby extending the distance between the axle 26 and pin 31 according to one tooth of the gear 1. In this end position, the straight position of the levers 27 and 28 limits the rotation of the disc 20 by means of the spring 29. The numeral adjusted in the actuating mechanism will therefore be increased to the next numeral by turning the disc 20. As soon as the first number roller is turned over "9," a "1" appears on the tenth roller.

In order to return the tenth roller to its initial position, a cam disc 24ª is provided, preferably made as an end disc 24 having a cam surface. Thus the lifting of the nose of the lever 28 at the end of a revolution of the calculating machine to apply a tension to the spring 29 causes the lever 27 guided by the cam portion of the slot 30 to engage the notch portion of the latter, thus returning the tenth carrying mechanism to its initial position.

The cam of the disc 24ª is preferably formed in such a way that it will not only arrest the disc 20 during the idling period but in addition it will also block the tenth carrying mechanism in the starting position by continuous pressure upon the nose of the lever 28.

The invention is not limited to the described example but may be used in the same way and with the same advantage anywhere where a rotary actuating mechanism is expected to operate in a soft, shock free and noiseless manner. A finer division of the adjusting steps can be obtained by providing finer internal teeth on the output member or by providing a smooth surface (internal clutch). Greater forces may be transmitted by the actuating mechanism if the parts are made wider in the direction of its axis and shaped like rollers.

I claim:

1. In apparatus for converting continuous, constant speed rotation to intermittent rotation at speeds varying gradually between zero and the constant speed, the combination with a driving member and a driven member, of motion transmitting means affording a releasable positive coupling between said members, said motion transmitting means comprising cooperating driving and driven coupling elements adapted for positive engagement to couple and release said members, means effecting periodic displacement of said driving coupling element in a direction opposed to the direction of rotation of said driving member, and devices automatically operable by means to engage and disengage said coupling elements only during the period of such displacement, whereby the inertia of the driven member is overcome gradually during coupling and release of said members.

2. In apparatus for converting continuous, constant speed rotation to intermittent rotation at speeds varying gradually between zero and the constant speed, the combination with a driving member and a driven member, of motion transmitting means affording a releasable coupling between said members, said motion transmitting means comprising cooperating driving and driven coupling elements supported for rotation respectively with said driving and driven members, actuating devices for effecting alternate engagement and disengagement of said elements to couple and release said members, and means effecting displacement of said driving coupling element in a direction opposed to the direction of rotation of said driving member, and at a comparable rate, during operation of said actuating devices to couple and release said members, whereby the inertia of the driven member is overcome gradually during coupling and release of said members.

3. In apparatus for converting continuous rotation to intermittent rotation, the combination with a driving member and a driven member, of motion transmitting means affording a releasable positive coupling between said members, said motion transmitting means comprising cooperating driving and driven coupling elements carried by said driving and driven elements respectively and adapted for positive engagement to couple and release said members, means effecting periodic displacement of said driving coupling element in a direction opposed to the direction of rotation of said driving member, the rate of displacement being such that the speed of rotation of said driving coupling element is reduced substantially to zero, and devices operable in timed relation to said last named means to engage and disengage said coupling elements only during the period of such displacement, whereby the inertia of the driven member is overcome gradually during coupling and release of said members.

4. In an intermittent drive for use in calculating machines, the combination with a driving member and a driven member, of a pawl with driving element and ratchet device engageable to couple said members for rotation, actuating devices for effecting periodic engagement and disengagement of said pawl and ratchet device, and cam means for retarding rotation of the driving element of said pawl and ratchet device during operation of said actuating devices, whereby engagement and disengagement of said pawl and ratchet device is effected while the said device is substantially at rest.

5. In an intermittent drive mechanism, the combination with rotatable driving and driven members, of a pair of releasable coupling devices, each coupling device having cooperating driving and driven elements carried respectively by said driving and driven members to provide a positive driving connection between said members, normally fixed cam means positioned for operative engagement with each of said coupling devices with means to effect periodic coupling and release of the elements thereof, said cam means being mounted for relative adjustment to vary the instant of engagement and release of the elements of each of said coupling devices and operable to retard the rotational speed of the driving element of each of said coupling devices during periods of coupling and release thereof, whereby the inertia of the driven member may be overcome gradually.

6. In an intermittent drive mechanism, the combination with rotatable driving and driven members, of a pair of releasable coupling devices, each coupling device having cooperating driving and driven elements carried respectively by said driving and driven members to provide a positive driving connection between said members, normally fixed cam means positioned for operative engagement with each of said coupling devices with means to effect periodic coupling and release of the elements thereof, said cam means being mounted for relative adjustment to vary the instant of engagement and release of the elements of each of said coupling devices and operable during periods of coupling and release of said coupling devices to displace in a direction reverse to the direction of rotation of said driving member, and at a comparable rate, the driving element of the coupling device.

7. In a mechanical movement for converting rotary to intermittent rotary motion, the combination with rotary driving and driven members, of positively engageable driving and driven coupling elements carried respectively by said members, actuating means for intermittently coupling and releasing said elements during rotation of said driving member, and means operable in timed relation with said actuating means for decelerating and driving coupling element to reduce its effective rotational speed substantially to zero at the instants of coupling and of release of said elements.

References Cited in the file of this patent

UNITED STATES PATENTS

| | | |
|---|---|---|
| 1,873,633 | Pitter | Aug. 23, 1932 |
| 1,961,414 | Dayton | June 5, 1934 |

FOREIGN PATENTS

| | | |
|---|---|---|
| 546,675 | France | Nov. 21, 1922 |